July 20, 1965 I. HOROWITZ 3,196,361
WIDE-BAND VIDEO SIGNAL AMPLIFIER SYSTEM
Filed July 24, 1961
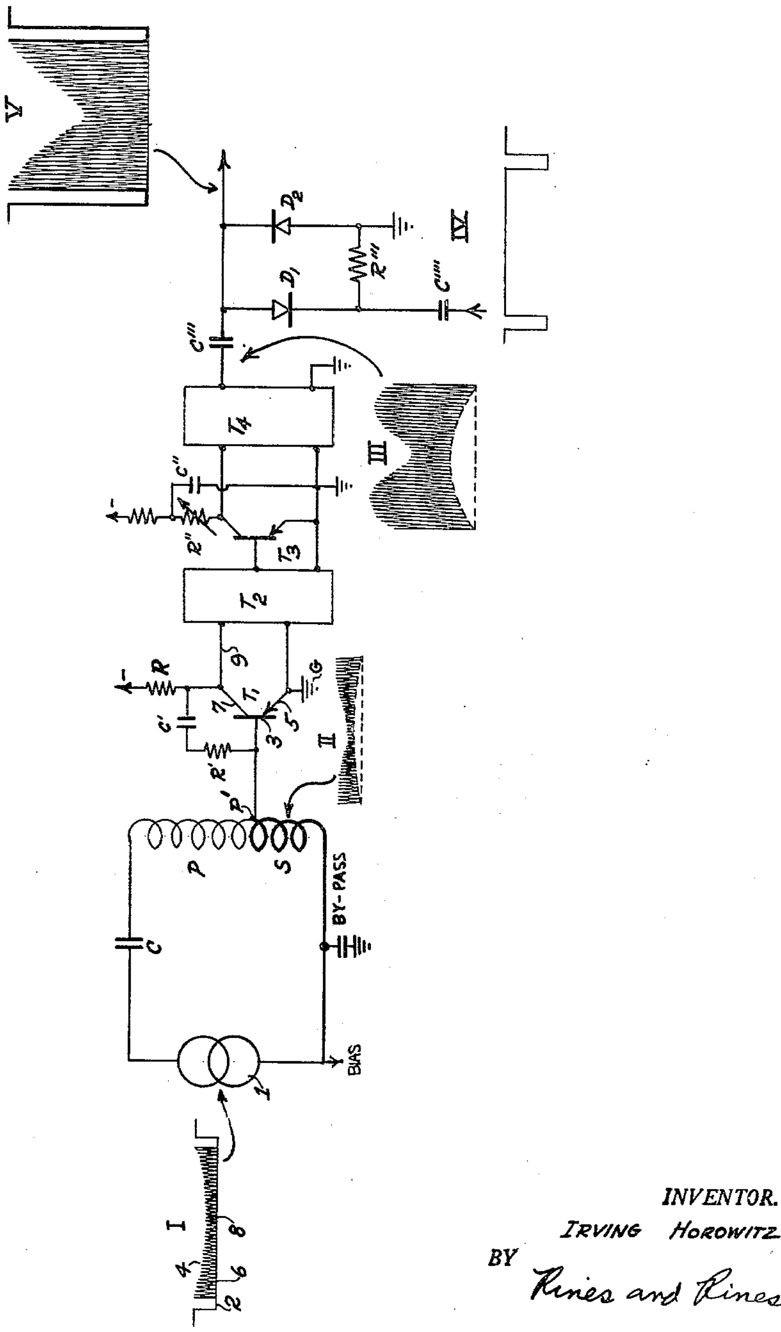
INVENTOR.
IRVING HOROWITZ
BY Rines and Rines
ATTORNEYS United States Patent Office 3,196,361
Patented July 20, 1965

3,196,361

WIDE-BAND VIDEO SIGNAL AMPLIFIER SYSTEM

Irving Horowitz, Eatontown, N.J., assignor to Blonder-Tongue Electronics, Newark, N.J., a corporation of New Jersey Filed July 24, 1961, Ser. No. 126,129
9 Claims. (Cl. 330—11)

The present invention relates to video amplifier systems and methods, and more particularly to video circuits requiring the use of transformer coupling.

The problem of providing a satisfactory transformer for coupling, with substantially uniform response, signals varying from very low frequencies up to many megacycles, has long plagued the art. Various types of comprising devices have been employed, but no satisfactory system for providing a relatively simple and inexpensive transformer-coupled video amplifier apparatus has heretofore been provided.

An object of the present invention, accordingly, is to provide a new and improved very wide-band video coupling and amplifying system that is particularly adapted for use with relatively low load impedances, as compared with the relatively high impedances of customary sources of video signals.

An additional object of the invention is to provide a new and improved video amplifier system.

Still a further object is to provide a novel amplifying system and method that are particularly adapted for use with low-impedance loads such as transistors.

Other and further objects will be explained hereinafter and will be more particularly pointed out in the appended claims.

The invention fill now be described in connection with the accompanying drawing, the single figure of which is a schematic circuit diagram illustrating the invention embodied in a preferred form.

Referring to the drawing, a preferably high-impedance, substantially constant-current source of wide-band video signals, including low-frequency signal components with an associated direct-current signal component, intermediate kilocycle radio-frequency signal components, and high megacycle radio-frequency signal components, is shown at 1. The wave-form I to the left thereof depicts a typical vidicon or other similar video signal of this character embodying periodic blanking pulses of low frequency as shown at 2, intermediate video intelligence shown at 4, and horizontal sweep-circuit signals as shown at 6, all positioned with respect to a direct-current reference level 8. The output of the vidicon or other relatively high-impedance source of video signals must be amplified in video-amplifier stages which, in accordance with the present invention, are preferably of low impedance compared with the impedance of the vidicon or other high-impedance constant-current source of video signals 1, such as the transistor amplifier stage T1. The output of the source of wide-band video signals 1 is shown connected through capacitor C to a transformer, preferably, though not essentially, of the autotransformer type, embodying a primary winding P and a secondary winding S. Since the transistor T1 is of relatively low impedance compared with that of the source 1, the transformer P, S is a step-down transformer with the primary winding P having many more windings or turns than the secondary winding S. The output of the transformer is shown taken from the intermediate tap P′ and applied to the base 3 of the first relatively low input-resistance transistor stage T1, the emitter 5 of which is shown grounded at G, and the collector 7 of which is connected through a resistor R to a source of negative potential (−), and to an output conductor 9.

As before indicated, it is not feasible to provide a simple transformer that can pass all of the components of the wide-band video signal I. In accordance with the present invention, therefore, the secondary winding S is deliberately constructed to provide sufficient inductance to accept the kilocycle frequency range and, of course, the megacycle range, also, but to reject the direct-current signal components and the low frequency blanking signal components, as well. This result may be affected by winding the primary winding P with fine wire, such as for example, No. 48 wire, and winding the fewer turns of the secondary winding S with large wire, such as No. 40, to provide sufficient inductance, for example, to commence acceptance of the 15-kilocycle frequency component of the video signal I. Under such circumstances, accordingly, the direct-current level 8 of the wave-form I, and the low-frequency blanking signal components 2 will become lost or rejected, as shown at wave-form II. The amplifier T1 will thus amplify this sub-band of the original wide-band video input signal, and to this end, the amplifier T1 may be supplemented by successive further video amplifier stages, as shown at T2 and T3.

The shunt inductance of the transformer and the input resistance of the transistor T1, will serve as a differentiating circuit at certain predetermined frequencies. If one considers a pure white television picture signal, the wave-form I would be a flat constant-level rectangular pulse instead of the fluctuating signal 4. Differentiation by the shunt inductance of the transformer and the input resistance of the amplifier T1 would introduce a downward tilt in this flat level, which would result in an improper shading of the actual video picture ultimately produced. It has been found that this effect may be avoided by the use of an inverse feedback path shown comprising a capacitor C′ and a resistor R′ connected from the collector 7 of the amplifier relay T1 to the base 3. This circuit not only serves the conventional function of stabilizing the gain in the amplifier T1, but it also lowers the effective value of the input resistance of the transistor T1. Differentiation, accordingly, will take place at a much lower frequency, outside the band of interest, tending to level off the white signal response and thus tending to eliminate the improper shading effect before discussed. This will not, moreover, alter the signal-to-noise ratio of the system since the feedback path C′R′ feeds back both signals and noise.

The expedient of the feedback path C′R′, however, does not completely correct for the tilt before referred to. Final correction therefor, may be effected, however, by introducing a low-frequency phase network, illustrated at R″ and C″ in the output of the amplifier stage T3. The network is adjusted, as by varying the resistance R″, to provide low-frequency phase compensation, and to boost the low frequency of the response, thereby extending the region of the flat low-frequency response. This will further enable the levelling off of a pure white signal wave-form so as to obviate the effects of possible differentiation by the type of transformer and amplifier stage T1 herein employed, and thereby avoid improper shading of the ultimate television signal.

The output of the final amplifier stage T4, for the particular example illustrated in the drawing, will thus be an amplified version faithfully reproducing the wave-form II, as shown at III; again, however, void of the low-frequency blanking and other signals and void of proper direct-current level.

In accordance with the present invention, this amplified signal III is artificially rendered an accurate amplified reproduction of the original signal wave-form I, by inserting, as with the aid of the oppositely poled diodes D1 and D2 connected to the output coupling capacitor C''' of the last stage T4, pulses, shown at IV, keyed at, for example, the before-mentioned 15-kilocycle intermediate-frequency rate. This has the effect of artificially restoring the low-frequency blanking signal components to the amplified signal and the direct-current level, also, through the resulting clamping action. The diodes are fed the pulses IV during the normal blanking periods, through capacitor C'''' which directly connects to the diode D1 and connects through a grounded resistor R''' to the other diode D2.

As an illustration, the step-down ratio between the windings P and S may be of the order of 2½ or 3-to-1. The constant-current vidicon 1 or other source may have a high impedance of the order of 500 megohms; and the input impedance of the first transistor stage T1 may have a low-frequency impedance that is substantially resistive, say, of the order of 2000 ohms, and a high-frequency impedance that is substantially capacitive, of value, for example, about 100 micromicrofarads.

Further in connection with the transformer P, S it is necessary, in addition to providing sufficiently large inductance in the secondary to accept the intermediate kilocycle and high megacycle radio frequency components while rejecting the direct current and low frequency components electrically to separate the windings P and S from one another in order to reduce the capacitance coupling therebetween sufficiently to cause any frequency trapping effects that may be due to out-of-phase voltages, resulting from the said capacitive coupling, to occur outside the wide video band of interest.

Modifications will occur to those skilled in the art and all such are considered to fall within the spirit and scope of the invention as defined in the appended claims.

What is claimed is:

1. A wide-band amplifier for amplifying low, intermediate and high-frequency signal components having, in combination, amplifying means provided with an input circuit of predetermined input resistance and an output circuit, transformer means connected in the input circuit for rejecting the low-frequency signal components and accepting only the intermediate and high-frequency signal components in order to produce in the said output circuit amplified accepted intermediate and high-frequency signal components, and clamping means connected to the said output circuit for artificially generating therein low-frequency signal components corresponding to the rejected low-frequency signal components, the number of turns of the transformer means being adjusted to produce a transformer shunt inductance of value such that, together with the amplifier input resistance comprises a differentiation circuit to differentiate the signal components substantially at a differentiation frequency lower than the said low-frequency components of the said band.

2. A wide-band amplifier as claimed in claim 1 and in which a feedback path is provided between output and input of the amplifier to lower the effective value of the amplifier input resistance.

3. A wide-band amplifier as claimed in claim 1 and in which means is provided within the amplifier means between its said input and output circuits for boosting the low-frequency signal components.

4. A wide-band video-signal amplifier having, in combination, a high impedance source of wide-band video signals including a direct-current signal component, low-frequency signal components, intermediate kilocycle radio-frequency signal components and high megacycle radio-frequency signal components; a relatively low impedance amplifier stage presenting a substantially resistive impedance at the said low-frequency signal components and a substantially capacitive impedance at the high radio-frequency signal components; means connecting the high impedance source to drive the relatively low impedance amplifier stage comprising a step-down transformer the primary winding of which is connected to the source and the secondary winding of which is connected to the amplifier stage and is provided with sufficiently large inductance to accept the intermediate and high radio-frequency signal components but to reject the direct-current and low-frequency signal components, and with the windings electrically separated from one another to reduce the capacitive coupling therebetween sufficiently to cause any frequency trapping effects resulting from the said coupling to occur outside the said band; and means connected to the amplifier stage and keyed at the intermediate kilocycle radio-frequency signal component rate artificially to restore the direct-current and low-frequency signal components to the amplified video signal.

5. A wide-band video signal amplifier as claimed in claim 4 in which the number of turns of the transformer is adjusted such that the resulting transformer shunt inductance together with the amplifier stage input resistance comprises a differentiation circuit to differentiate the signal.

6. A wide-band video signal amplifier as claimed in claim 4 and in which a feedback path is provided between the output and input of the amplifier stage to lower the effective value of the amplifier stage input resistance.

7. A wide-band video signal amplifier as claimed in claim 4 and in which means is provided within the amplifier stage for boosting the low frequency signal components.

8. A wide-band video signal amplifier as claimed in claim 4 and in which the last-named means comprises a double diode circuit.

9. A wide-band amplifier as claimed in claim 4 and in which the amplifier stage comprises a plurality of successively connected amplifiers one of the successive connections of which includes a low-frequency phase compensation network for boosting the low-frequency response.

References Cited by the Examiner

UNITED STATES PATENTS

| | | | |
|---|---|---|---|
| 2,630,486 | 3/53 | Rieke | 178—7.3 |
| 2,883,454 | 4/59 | Sziklai et al. | 330—11 X |

ROY LAKE, *Primary Examiner.*

ARTHUR GAUSS, *Examiner.*